Nov. 14, 1950     L. C. MILLER     2,530,170
SHIPPING CRATE FOR ANIMALS
Filed March 15, 1948     2 Sheets-Sheet 1
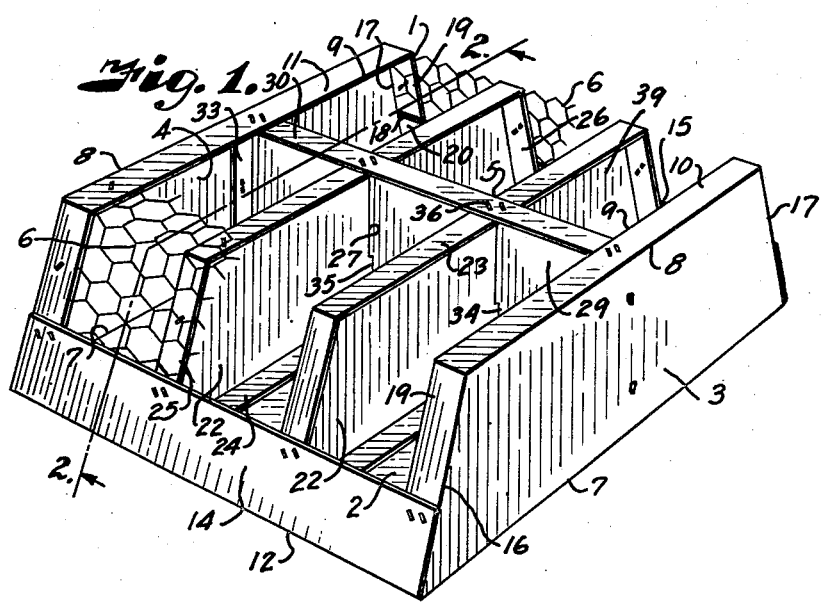
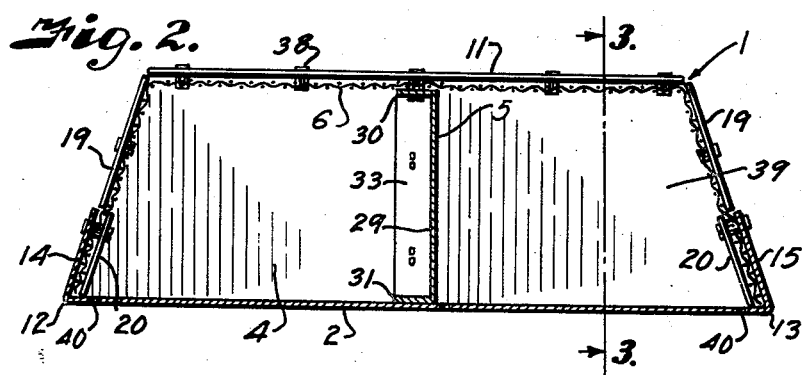
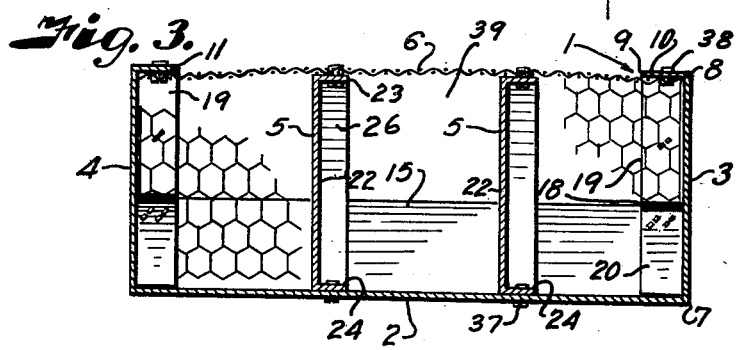
Inventor
Leland C. Miller
By Fishburn & Mullendore
Attorneys

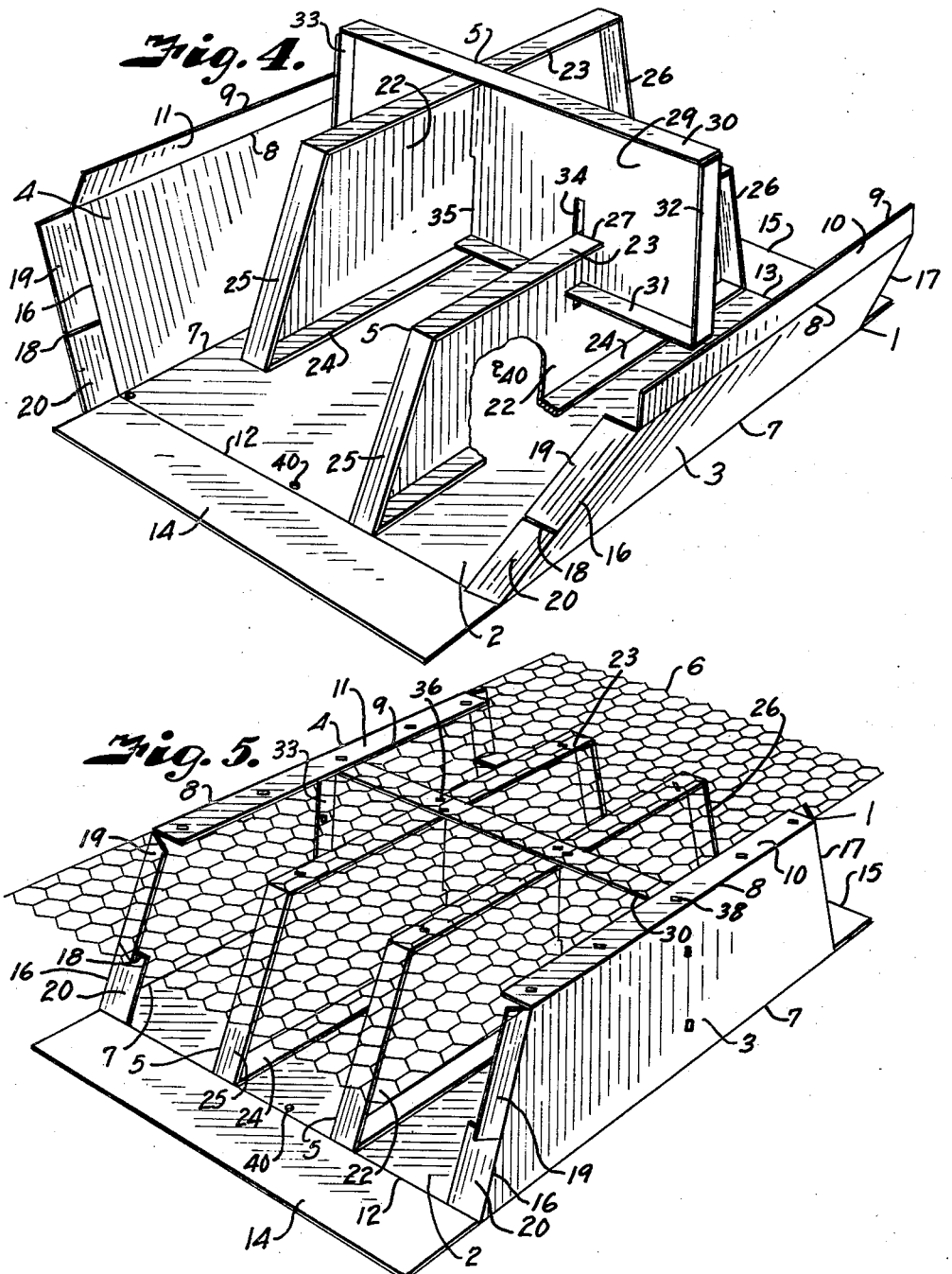

Patented Nov. 14, 1950

2,530,170

UNITED STATES PATENT OFFICE 2,530,170

SHIPPING CRATE FOR ANIMALS

Leland C. Miller, Kansas City, Mo., assignor to Midwest Game Co., Inc., Kansas City, Mo., a corporation of Missouri Application March 15, 1948, Serial No. 14,895

3 Claims. (Cl. 229—16)

This invention relates to shipping crates, and more particularly to shipping crates for small animals such as rabbits or the like that have a tendency to gnaw or chew the crate in attempting escape.

It is common practice to capture wild rabbits and the like and ship same in wooden crates which are relatively expensive and may be reused only after being thoroughly cleaned. The return of the crates to the point of shipment also involves considerable expense. Wood has been used for such crates due to the tendency of the rabbits to gnaw through confining walls of less substantial material, particularly where there is an edge of the material available for the animal to start the gnawing process.

The principal objects of the present invention are to provide a shipping crate of paper and wire so arranged that an animal such as a rabbit does not gnaw therefrom; to provide a shipping crate of paper or fiber and wire that can be manufactured and sold relatively cheaply to make it economical to discard the crate after use; to provide a crate in which animals may be inserted and enclosed therein and released therefrom with the least possible handling of said animals, said crate permitting full view of said animals for inspection and complete ventilation while stacked during shipment; and to provide a paper and wire crate having strength sufficient to stand the usual strain put upon such containers in the process of transportation and handling.

In accomplishing these and other objects of the present invention, I have provided improved details of structure, the preferred forms of which are illustrated in the accompanying drawings, wherein:

Fig. 1 is a perspective view of a shipping crate for small animals, portions of the wire covering being broken away.

Fig. 2 is a longitudinal sectional view through the crate on the line 2—2, Fig. 1, showing the portions thereof closed as during shipment.

Fig. 3 is a transverse sectional view through the shipping crate on the line 3—3, Fig. 2.

Fig. 4 is a perspective view of the respective paper parts of the shipping crate.

Fig. 5 is a perspective view of the crate with the ends thereof open for the insertion or removal of the animals therefrom.

Referring more in detail to the drawings:

1 designates a shipping crate formed of fibrous paper or corrugated fiberboard preferably coated with wax or the like to substantially waterproof same. The shipping crate consists of a bottom 2, sides 3—4 and partitions 5 all formed of the waxed paper and having suitable flaps thereon for securing a covering of wire 6 to the paper portions of the crate as later described. While the crate may be constructed of various numbers of pieces, the sides 3 and 4 are preferably integral with the bottom 2 and are defined by inner and outer score lines 7 and 8 suitably spaced to define the height of the crate, the outer score line 8 being spaced from the edges 9 of the blank to form inturned flaps 10 and 11. The ends of the bottom member 2 are defined by transverse score lines 12 and 13 spaced from the ends of the blank to define end flaps 14 and 15 preferably less than one-half the height of the sides 3 and 4. The end edges of the sides 3 and 4 are defined by score lines 16 and 17 sloping upwardly and inwardly from the corners of the bottom member whereby the length of the sides along the score line 7 is longer than the length along the score line 8 and the ends of the crate will slope as later described. The score lines 16 and 17 also define extensions on the ends of the side members, said extensions being notched as at 18 to form upper and lower flaps 19 and 20.

In the illustrated crate the spacing between the score lines 7 is sufficient to accommodate three rabbits, and the spacing between the score lines 12 and 13 is sufficient to accommodate the length of two rabbits. It is desirable to separate the rabbits, therefore partitions 5 are formed of suitable waxed paper, the longitudinal partitions each preferably consisting of a wall 22 substantially the same shape and size as the sides 3 and 4. The upper and lower edges of the wall 22 are provided with flanges 23 and 24 and the end edges are provided with flanges 25 and 26. The upper portion of the partitions 21 substantially midway the ends thereof is provided with a slot 27 which extends through the flange 23 to facilitate placing of the transverse partition substantially midway the length of the box, said partition comprising a vertical wall 29 substantially rectangular in shape and of the same length as the spacing between the score lines 7 and the same height as the sides 3 and 4, the partition 28 being provided with upper and lower flanges 30 and 31 and end flanges 32 and 33. The lower portion of the partition 28 is preferably provided with spaced slots 34 and 35 extending upwardly from the bottom edge of said partition to substantially the midpoint of the height thereof, said slots having the same spacing as the longitudinal partitions whereby said slots cooperate with the slots 27 in said partitions in assembling the transverse partition at right angles to the longitudinal partitions whereby the flanges 30 and 31 thereof overlap the flanges 23 and 24 respectively.

The wire covering 6 is preferably a rectangular piece of open mesh having a width substantially the same as the spacing between the score lines 7 and having a length substantially the same as the length of the score line 8 and twice the height of the sides 3 and 4.

In assembling a crate a blank 9 is laid flat and the transverse partition is arranged thereon transversely of the longitudinal partitions with the slots 34 and 35 substantially in alignment with the slot 27. The transverse partition is then moved downwardly over the longitudinal partitions whereby the respective slots engage the solid portions. The flaps 30 and 31 overlie the flaps 23 and 24 respectively and are secured thereto by suitable fastening devices such as staples 36. The assembled partitions are then placed on the bottom member 2 with the ends of the partitions adjacent the score lines 7, 12 and 13 respectively. The flanges 33 and 24 are then secured to the bottom member 2 by suitable fastening devices such as staples 37. The sides 3 and 4 are then turned upwardly into engagement with the flaps 32 and 33 respectively and stapled thereto. The wire covering 6 is then placed over the flanges 23 and 30 of the partitions with the side edges of said covering being arranged adjacent the sides 3 and 4 of the crate. The flaps 10 and 11 are then turned inwardly over the wire covering and suitable staples 38 applied to secure the wire covering to the flaps 10 and 11 and flaps 23 and 30. The ends of the wire covering then extend straight outwardly and the crate is ready for insertion of rabbits or small animals into the respective compartment 39 formed by the sides, bottom, partition and covering member. After the animals are inserted in the compartment at one end of the crate the flaps 20 are turned inwardly and the ends of the wire covering downwardly to overlie said flaps. The end flaps 14 on the bottom member are then turned upwardly and the flaps 19 turned inwardly and secured as by staples to the wire covering and adjacent flaps, the flap 14 being stapled to the flap 20 and to the flanges 25 on the longitudinal partitions. Animals are then inserted in the other end of the crate and said end closed in the same manner. The crate is then ready for shipping and may be stacked as desired. It is to be noted that this arrangement provides upwardly sloping end walls, the upper portion of which is formed by the mesh or grating whereby regardless of the arrangement of the crates there are spaces at the ends of the crate and the animals receive sufficient ventilation therethrough.

In shipping rabbits or other small game suitable feed is usually placed in each compartment. This feed may be placed before insertion of the animals and may be renewed at frequent intervals as desirable by inserting the feed through the openings in the mesh. It is also desirable that the bottom of the respective compartments remain as dry as possible, therefore suitable drainage openings 40 are placed in the bottom, for example, in the corners of the bottom member and along the transverse center of the bottom. Obviously other arrangements of drainage openings may be provided.

During shipment there is a tendency for the animals to try to gnaw an opening in the crate. Due to the teeth structure and arrangement the animals do not chew on the flat wall surfaces, but they do tend to start at the edge of a flange or the like and gnaw through the flange and then into the wall to form an opening therein. Gnawing through any of the flanges of the partitions does not permit escape of the animals as the wire covering is arranged thereover. The wire lays under the upper flanges 10 and 11 on the side members and flaps 19 on the end thereof. While the flaps 20 are inside of the wire to make a neat corner and secure the end of the wire thereat, the wire mesh between the flaps 14 and 20 tends to deter the animals from chewing on the flap 20, however, if desired the flap 20 may be placed on the outside of the wire covering to absolutely prevent any flanges being positioned whereby the animal could chew on same.

While I have described a crate capable of use for shipping six animals, obviously the same arrangements may be used for any size crate with suitable arrangement of partitions whereby the crate may be used for shipping one or more animals.

It is believed obvious that I have provided a light weight shipping crate of paper and wire that can be manufactured and sold cheaply, whereby it is economical to discard the crate after each use. After the crate reaches its destination, the flaps 14, 19 and 20 may be pulled loose and the ends of the wire covering lifted whereby the animals may be released as desired.

What I claim and desire to secure by Letters Patent is:

1. An animal shipping crate comprising, a paper bottom member, upturned paper side members on said bottom member, upturned paper end members on the bottom member, said end members being shorter in height than the side members, partitions secured to the bottom for dividing the crate into separate open top compartments for containing animals, inturned flaps on the free edges of the side members, an open wire mesh covering forming the top of said crate overlying the partitions and underlying the end members and the flaps on the side member, and means for securing the mesh to the respective flaps and end members whereby the wire mesh protects the edges of the paper from gnawing by animals contained in the compartments.

2. An animal shipping crate comprising, a waxed paper bottom member, upturned waxed paper side members on said bottom member, said side members having upwardly converging ends whereby the length of the bottom of the side members is longer than the length of the top thereof, waxed paper partitions secured to the bottom member for dividing the crate into separate open top compartments for containing animals, inturned flaps on the edges of the bottom, side and partition members, a mesh covering forming the top of said crate having edges underlying the flaps on the side and bottom members, and means for securing the mesh to the flaps whereby the mesh protects all the edges of the paper and prevents animals contained in the compartments from gnawing said edges.

3. An animal shipping crate comprising, a waxed paper bottom member, upturned waxed paper side members on said bottom member, said side members having upwardly converging ends whereby the length of the bottom of the side members is longer than the length of the top thereof, inturned flaps on the edges of the bottom and side members, a mesh covering forming the top of said crate having edges underlying the flaps on the side and bottom members, and means for securing the mesh to the flaps whereby the mesh protects the edges of the paper and prevents animals contained in the crate from gnawing said edges.

LELAND C. MILLER.

REFERENCES CITED

The following references are of record in the file of this patent:

UNITED STATES PATENTS

| Number | Name | Date |
|---|---|---|
| 444,561 | Thomasson | Jan. 13, 1891 |
| 1,042,086 | Clements | Oct. 22, 1912 |
| 1,513,608 | Labombarde | Oct. 28, 1924 |
| 1,647,018 | Ruebensaal | Oct. 25, 1929 |
| 2,021,426 | Quackenboss | Nov. 19, 1935 |
| 2,062,794 | Peters | Dec. 1, 1936 |
| 2,138,112 | Means | Nov. 29, 1938 |
| 2,297,987 | Ryerson | Oct. 6, 1942 |
| 2,458,113 | Stevens | Jan. 4, 1949 |